United States Patent
Kitakawa

(10) Patent No.: US 8,874,278 B2
(45) Date of Patent: Oct. 28, 2014

(54) POWER SUPPLY CONTROL DEVICE, IMAGE FORMING APPARATUS, AND METHOD OF CONTROLLING POWER SUPPLY

(75) Inventor: Takehisa Kitakawa, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 572 days.

(21) Appl. No.: 12/890,030

(22) Filed: Sep. 24, 2010

(65) Prior Publication Data
US 2011/0089922 A1 Apr. 21, 2011

(30) Foreign Application Priority Data

Oct. 19, 2009 (JP) .................................. 2009-240431
Jun. 14, 2010 (JP) .................................. 2010-135385

(51) Int. Cl.
*G05D 5/00* (2006.01)
*G06F 1/30* (2006.01)
*G06F 11/14* (2006.01)
*G06F 13/00* (2006.01)
*G06F 1/00* (2006.01)
*G06F 11/20* (2006.01)

(52) U.S. Cl.
CPC .............. *G06F 1/30* (2013.01); *G06F 11/1441* (2013.01); *G06F 11/2015* (2013.01)
USPC ............ 700/297; 711/104; 711/154; 713/300

(58) Field of Classification Search
USPC .......... 700/292–293, 295–298; 711/103–105, 711/154; 713/300
See application file for complete search history.

(56) References Cited

U.S. PATENT DOCUMENTS

| | | | | |
|---|---|---|---|---|
| 4,483,605 A * | 11/1984 | Krumrein et al. | ............. | 396/159 |
| 4,584,623 A * | 4/1986 | Bello et al. | ............. | 361/90 |
| 7,278,034 B2 * | 10/2007 | Shipton | ............. | 713/300 |
| 7,933,265 B2 * | 4/2011 | Kawamata | ............. | 370/360 |
| 8,024,508 B2 * | 9/2011 | Son et al. | ............. | 711/103 |

(Continued)

FOREIGN PATENT DOCUMENTS

| | | |
|---|---|---|
| JP | 7-248977 | 9/1995 |
| JP | 2004-110334 | 4/2004 |

(Continued)

OTHER PUBLICATIONS

Extended European Search Report issued Feb. 24, 2011, in Application No. / Patent No. 10184122.9-2224.

(Continued)

*Primary Examiner* — Adolf Berhane
*Assistant Examiner* — Henry Lee, III
(74) *Attorney, Agent, or Firm* — Oblon, Spivak, McClelland, Maier & Neustadt, L.L.P.

(57) ABSTRACT

A power supply control device includes an electrical power generating unit that generates electrical power and supplies the generated electrical power to an electronic device having a nonvolatile memory and a control unit; a switching unit that monitors a voltage of electrical power supplied to the electronic device, and switches such that, when the voltage is less than a predetermined threshold value, the electrical power is supplied to the control unit and is not supplied to the nonvolatile memory; and a capacitor that maintains, when the electrical power is switched to be supplied to the control unit, a voltage applied to the nonvolatile memory for a period of time during which writing of data to the nonvolatile memory can be completed.

14 Claims, 6 Drawing Sheets

(56) References Cited

U.S. PATENT DOCUMENTS

| | | | |
|---|---|---|---|
| 2006/0015683 A1 | 1/2006 | Ashmore et al. | |
| 2006/0069870 A1 | 3/2006 | Nicholson et al. | |
| 2006/0279996 A1* | 12/2006 | Yu et al. | 365/185.21 |
| 2008/0215808 A1 | 9/2008 | Ashmore et al. | |
| 2008/0250256 A1 | 10/2008 | Hagiwara | |
| 2009/0125156 A1* | 5/2009 | Killian et al. | 700/291 |
| 2009/0254772 A1* | 10/2009 | Cagno et al. | 713/340 |
| 2010/0008175 A1* | 1/2010 | Sweere et al. | 365/229 |

FOREIGN PATENT DOCUMENTS

| | | |
|---|---|---|
| JP | 2004-272309 | 9/2004 |
| JP | 2005-327210 | 11/2005 |
| JP | 2009-288903 | 12/2009 |

OTHER PUBLICATIONS

Japanese Office Action issued Oct. 15, 2013, in Japan Patent Application No. 2010-135385 (with English translation).

* cited by examiner

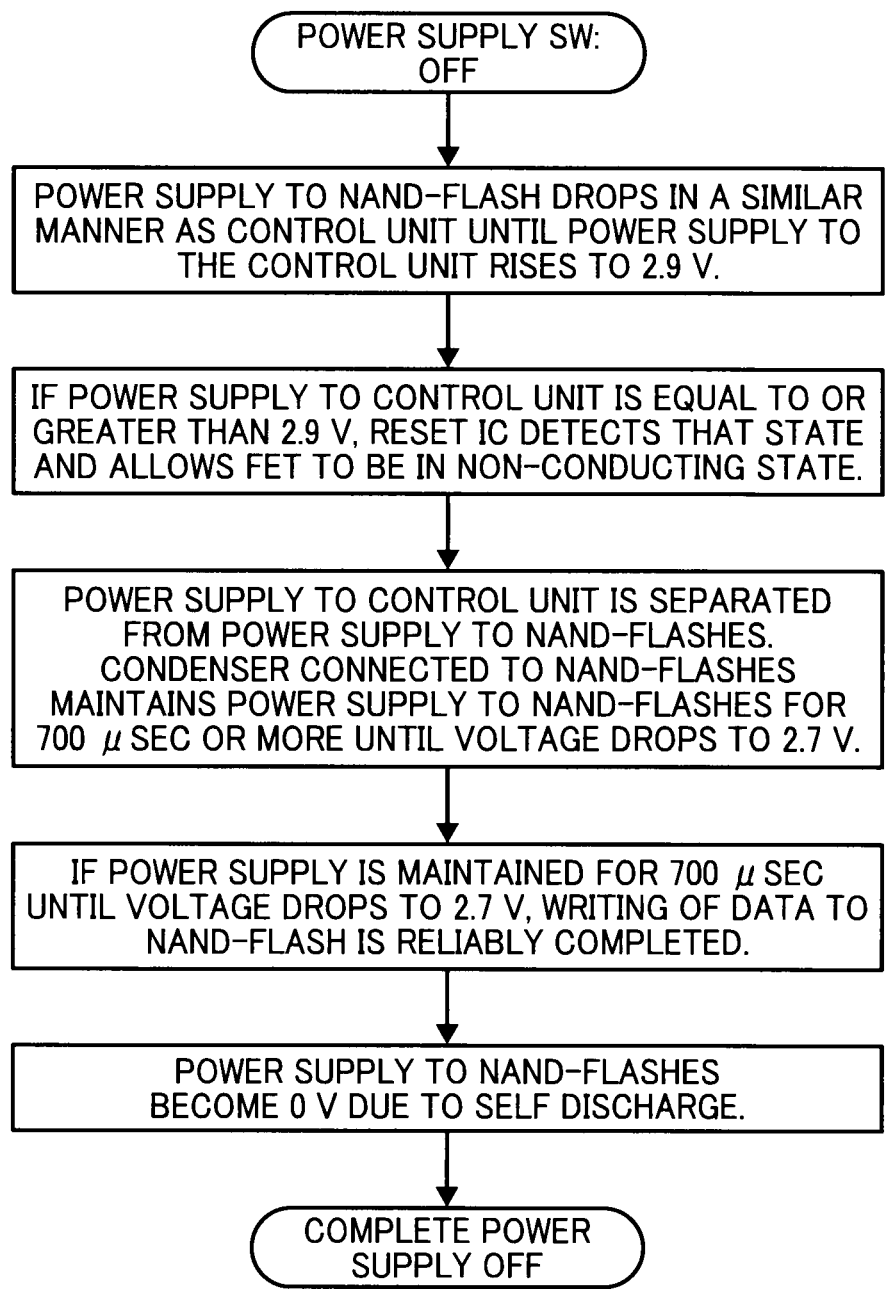

POWER SUPPLY CONTROL DEVICE, IMAGE FORMING APPARATUS, AND METHOD OF CONTROLLING POWER SUPPLY

CROSS-REFERENCE TO RELATED APPLICATIONS

The present application claims priority to and incorporates by reference the entire contents of Japanese Patent Application No. 2009-240431 filed in Japan on Oct. 19, 2009 and Japanese Patent Application No. 2010-135385 filed in Japan on Jun. 14, 2010.

BACKGROUND OF THE INVENTION

1. Field of the Invention

The present invention relates to a power supply control device, an image forming apparatus, and a method of controlling power supply.

2. Description of the Related Art

Electronic devices, such as power supply control devices and image forming apparatuses, are constituted by a system that has various devices including a CPU, a RAM, and a nonvolatile storage medium and constituted by software, such as an operating system (OS) that is stored in a nonvolatile storage medium.

Hard disk drives (HDDs) or flash memories can be used as the nonvolatile storage media that constitute part of the system. However, when flash memories are used, in some cases, a certain block in a flash memory may be corrupted due to a sudden power supply interruption during writing of data, which is a problem.

Accordingly, if flash memories are used, a method of using backup power supplies in case of a sudden power supply interruption is known.

However, with the method of using such a backup power supply, the entire system is protected by the backup power supply; therefore, there is a problem in that a large-capacity power supply is required as a backup power supply, and there is a problem in that a small-capacity power supply cannot protect the entire system. Furthermore, with the method of using such a backup power supply, because the backup power supply is usually controlled by software, it does not effectively perform, for example, just after the software is activated, which is also a problem.

Accordingly, a device disclosed in, for example, Japanese Patent Application Laid-open No. 2005-327210 has been proposed. With the device of Japanese Patent Application Laid-open No. 2005-327210, even when the voltage of a battery (power supply) drops during the writing of data to a flash memory that is a nonvolatile memory, in order to prevent data of the flash memory to be corrupted, electrical power is supplied to the flash memory from a condenser if a battery voltage drops to a level equal to or lower than a predetermined level during the writing of data to the flash memory.

However, even when the device described in Japanese Patent Application Laid-open No. 2005-327210 is used, it is possible to prevent the corruption of a block of a flash memory even when a power supply is interrupted during the writing of data to the flash memory; however, a large-capacity condenser is needed.

SUMMARY OF THE INVENTION

It is an object of the present invention to at least partially solve the problems in the conventional technology.

According to an aspect of the present invention, there is provided a power supply control device including an electrical power generating unit that generates electrical power and supplies the generated electrical power to an electronic device having a nonvolatile memory and a control unit; a switching unit that monitors a voltage of electrical power supplied to the electronic device, and switches such that, when the voltage is less than a predetermined threshold value, the electrical power is supplied to the control unit and is not supplied to the nonvolatile memory; and a capacitor that maintains, when the electrical power is switched to be supplied to the control unit, a voltage applied to the nonvolatile memory for a period of time during which writing of data to the nonvolatile memory can be completed.

According to another aspect of the present invention, there is provided an image forming apparatus including a nonvolatile memory; a control unit that performs an overall control of the image forming apparatus; an electrical power generating unit that generates electrical power and supplies the generated electrical power to the nonvolatile memory and the control unit; a switching unit that monitors a voltage of electrical power supplied to the control unit, and switches such that, when the voltage drops to less than a predetermined threshold value, the electrical power is supplied to the control unit and is not supplied to the nonvolatile memory; and a capacitor that maintains, when the electrical power is switched to be supplied to the control unit, a voltage applied to the nonvolatile memory for a period of time during which writing of data to the nonvolatile memory can be completed.

According to still another aspect of the present invention, there is provided a method of controlling power supply that is performed by a power supply control device, the method including generating electrical power and supplying the generated electrical power to an electronic device having a nonvolatile memory and a control unit; monitoring a voltage of electrical power supplied to the electronic device; switching, when the voltage drops to less than a predetermined threshold value, the electrical power such that the electrical power is supplied to the control unit and is not supplied to the nonvolatile memory; and maintaining, when the electrical power is switched to be supplied to the control unit, a voltage applied to the nonvolatile memory for a period of time during which writing of data to the nonvolatile memory can be completed.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 6 is a flowchart illustrating an example of the operation flow of the power supply control circuit according to the embodiment when a power supply switch is turned on; and FIG. 7 is a flowchart illustrating an example of the operation flow in which the power supply switch according to the embodiment is turned off.

DETAILED DESCRIPTION OF THE PREFERRED EMBODIMENTS

In the following, a preferred embodiment according to the present invention will be specifically described below with reference to the accompanying drawings.

In the embodiment, the feature of the configuration of a power supply of a flash memory, which is a nonvolatile memory, is as follows. When a power supply interruption is detected, only the voltage that is applied to the flash memory is maintained at the voltage that is necessary for the writing of data for the period of time required for writing the data from a buffer in the flash memory to a ROM. Therefore, it is possible to avoid corrupting blocks of the flash memory when a power supply is interrupted during the writing of data. Details of the feature thereof will be described below.

Figure 1:
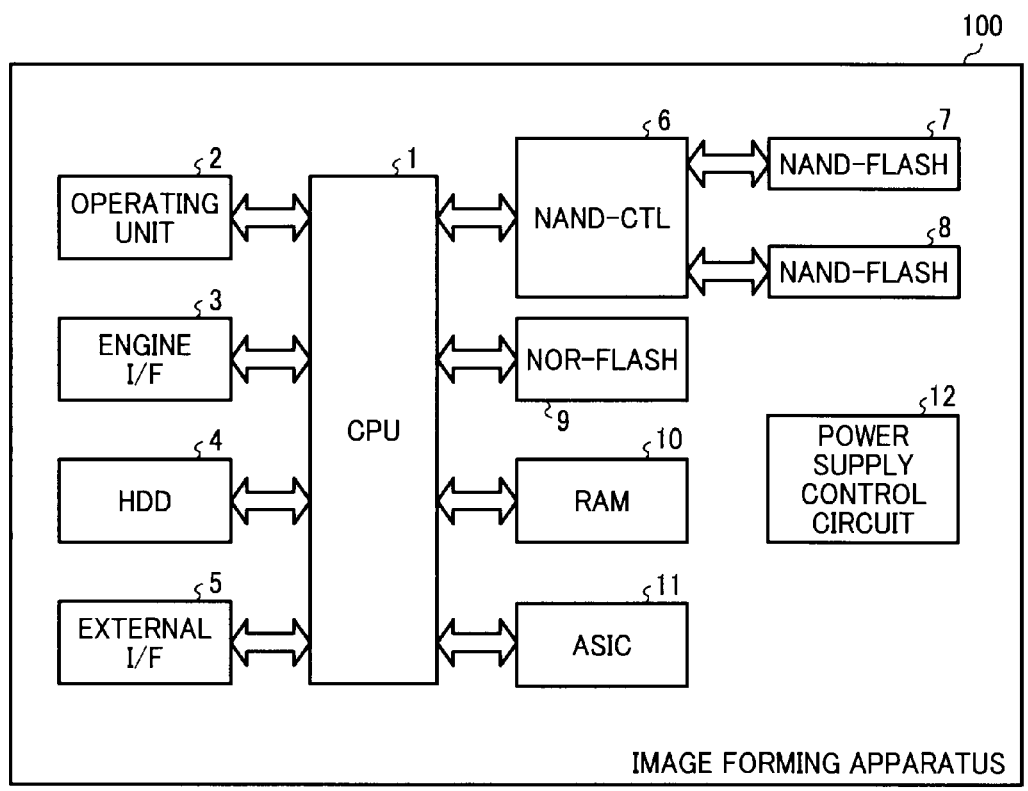
FIG. 1 is a block diagram illustrating the hardware configuration of an image forming apparatus equipped with a power supply control device according to an embodiment of the present invention.

FIG. 1 is a block diagram illustrating the hardware configuration of an image forming apparatus equipped with a power supply control device according to the embodiment.

An image forming apparatus 100 as an electronic device includes a CPU 1, an operating unit 2, an engine interface (hereinafter, also referred to as an "I/F") 3, an HDD (hard disk drive) 4, an external I/F 5, an NAND-CTL 6, NAND-Flashes 7 and 8 that are nonvolatile memories, an NOR-Flash 9 that is a nonvolatile memory, a random access memory (RAM) 10, an application specific integrated circuit (ASIC) 11, a power supply control circuit 12, and the like.

The CPU 1, the operating unit 2, the engine I/F 3, the HDD 4, the external I/F 5, the NAND-CTL 6, the NOR-Flash 9, the RAM 10, and the ASIC 11 constitute a control unit 21 (see FIG. 2) that performs the overall control of the image forming apparatus 100. The NAND-Flashes 7 and 8 constitute a NAND-Flash unit 22 (see FIG. 2), which will be described later.

The CPU 1 is a central processing unit that controls all of the components of the device (image forming apparatus 100). The CPU 1 expands, in the RAM 10, programs stored in the NAND-Flashes 7 and 8 or programs in the NOR-Flash 9 and activates (implements) the programs to control the device, thus implementing various functions.

The operating unit 2 is a user interface for an operator (user) that operates the device. The operating unit 2 includes various operation keys (also called an operation switch or an operation button) that are used to perform various information inputs or instructions (requests) and includes a display that displays various kinds of information.

The engine I/F 3 is a communication unit that is connected to an engine and that performs communication. The engine includes an image scanning unit, such as a scanning unit that scans an original image. The engine also includes an image forming unit, such as a printing unit that prints (image forming) image data that has been scanned by the image scanning unit or that prints print data that has been received from an external device, such as a PC (not shown), via the external I/F 5 on a print medium, such as a sheet, as an visible image. If the print data that is received from the external device is not image data for printing but is a character code or drawing data, such data is converted to image data for printing by the CPU 1 and the ASIC 11.

The HDD 4 is a hard disk drive functioning as a nonvolatile storage medium and can store therein various kinds of data, such as various programs.

The external I/F 5 is a network interface or an USB standard interface or an IEEE 1394 standard interface (direct interface) that is connected to an external device for communication.

The NAND-CTL 6 is a memory control circuit that controls writing/reading of data with respect to the NAND-Flashes 7 and 8.

The NAND-Flashes 7 and 8 are NAND-type flash memories functioning as nonvolatile storage media and stores therein various kinds of data, such as various programs.

The NOR-Flash 9 is a NOR-type flash memory functioning as a nonvolatile storage medium and can store therein various kinds of data, such as various programs.

The RAM 10 is a memory that is used as a program memory that stores therein various programs or a work memory that is used when the CPU 1 performs a process on data.

The ASIC 11 allows devices controlled by the CPU 1 to be shared and supports, from the viewpoint of architecture, effective development of, for example, application programs.

The power supply control circuit 12 corresponds to a power supply control device. The power supply control circuit 12 includes a electrical power generating unit that generates, using electrical power (supply power) from a commercial power supply (AC power supply), electrical power (DC power supply) that is supplied to the control unit 21, which will be described later, and supplies electrical power to (applies a voltage to) units including the CPU 1 and the NAND-Flashes 7 and 8 described above.

At this stage, the CPU 1 writes, via the NAND-CTL 6, data to the NAND-Flashes 7 and 8 or reads, via the NAND-CTL 6, the data in the NAND-Flashes 7 and 8 to expand the data in the RAM 10. Furthermore, the NOR-Flash 9 can write data directly from the CPU 1.

Figure 2:
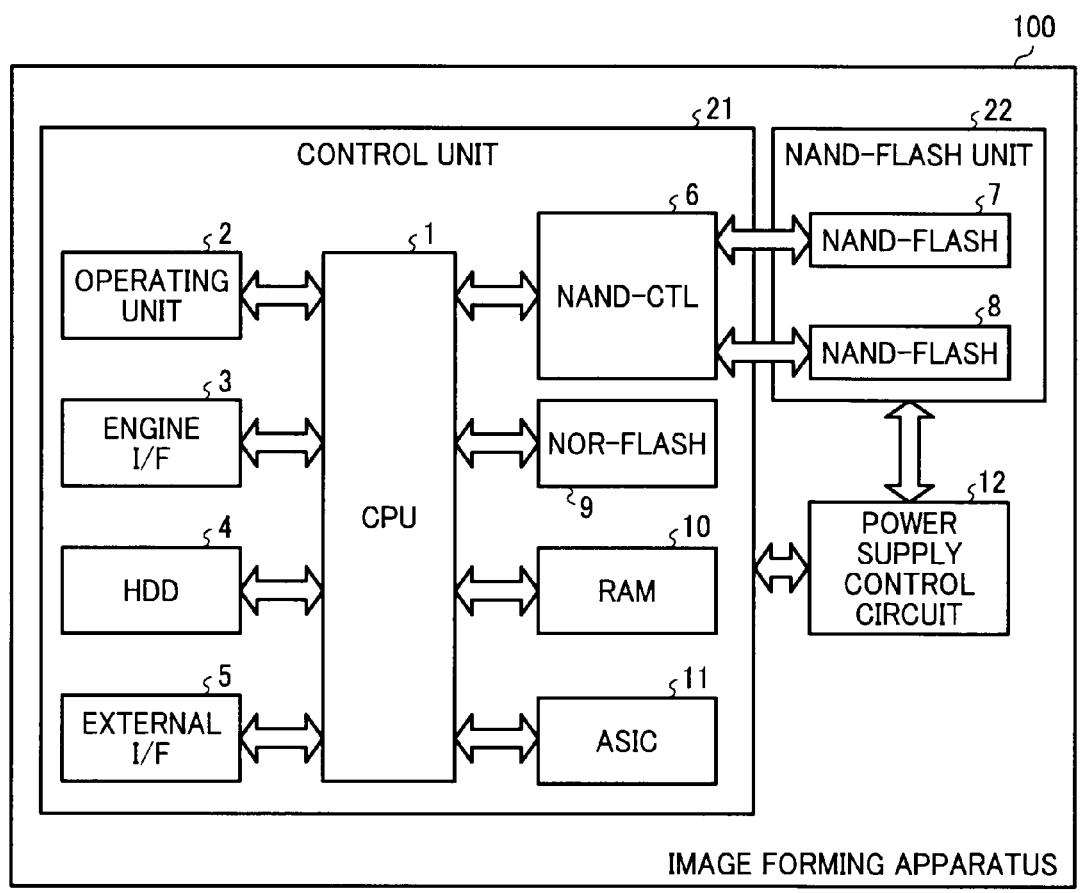
FIG. 2 is a block diagram illustrating the configuration of a power supply of the image forming apparatus according to the embodiment.

FIG. 2 is a block diagram illustrating the configuration of a power supply of the image forming apparatus 100 illustrated in FIG. 1. In the image forming apparatus 100, the power supply control circuit 12 generates, using electrical power provided from a commercial power supply, electrical power supplied to the control unit 21 and then directly supplies the electrical power to the units, such as the CPU 1, the operating unit 2, and the NAND-CTL 6, that constitute the control unit 21. However, the power supply control circuit 12 supplies the electrical power, via a field effect transistor, to the NAND-Flashes 7 and 8 that constitute the NAND-Flash unit 22. The electrical power supplied to the NAND-Flashes 7 and 8 via the field effect transistor is used as electrical power supplied to the NAND-Flash. In the following, the power supply control circuit 12 that generates electrical power supplied to the control unit 21 and electrical power supplied to the NAND-Flash unit 22 (NAND-Flashes 7 and 8) will be described with reference to FIG. 3.

Figure 3:
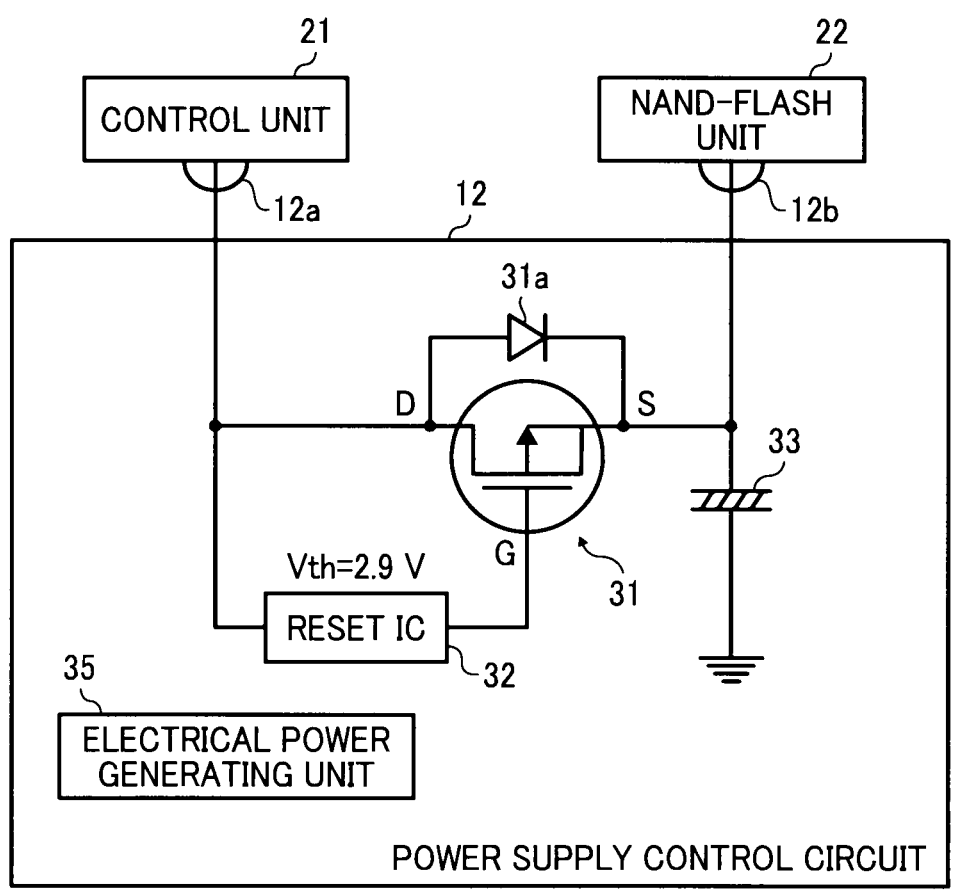
FIG. 3 is a circuit diagram illustrating the configuration of a power supply control circuit according to the embodiment.

FIG. 3 is a circuit diagram illustrating the configuration of the power supply control circuit 12 illustrated in FIG. 2. The power supply control circuit 12 includes an electrical power generating unit 35, a field effect transistor (hereinafter, referred to as an "FET") 31, a reset IC (reset circuit) 32, a condenser 33, and voltage output terminals 12a and 12b. The FET 31 and the reset IC 32 correspond to a switching unit, and the condenser 33 corresponds to a capacitor.

The electrical power generating unit 35 generates electrical power and supplies the generated electrical power to the control unit 21. The FET 31 is a P-type FET or an N-type FET and has a switching function such that the electrical power, which is supplied to the control unit 21 and is generated by the electrical power generating unit 35, is either supplied to the NAND-Flashes 7 and 8 or is not supplied to the NAND-Flashes 7 and 8 (i.e., the NAND-Flashes 7 and 8 are separated from the power supply to the control unit 21). Accordingly, in the FET 31, a voltage output terminal 12a that outputs a voltage of the power supply to the control unit 21 is connected to a drain terminal D; a voltage output terminal 12b that outputs a voltage of the power supply to the NAND-Flash unit 22 (NAND-Flashes 7 and 8) and one terminal of the condenser 33 are connected to a source terminal S; and an output terminal for the reset IC 32 is connected to a gate terminal G. As illustrated in FIG. 3, the voltage output terminal 12a is connected to the control unit 21, and the voltage output terminal 12b is connected to the NAND-Flash unit 22.

Furthermore, even when the FET 31 is not in a conducting state, a parasitic diode 31a is inserted between the drain terminal D and the source terminal S in such a manner that a voltage is applied to the NAND-Flashes 7 and 8 from the voltage output terminal 12b, thus reducing the charging time of the condenser 33.

The reset IC 32 monitors a voltage of the power supply to the control unit 21. If the monitored voltage is equal to or larger than a predetermined value ("2.9 V" in this case), the reset IC 32 allows the FET 31 to be in a conducting state by making a signal that is output to the gate terminal G of the FET 31 a high level "H". By doing so, the power supply of the control unit 21 becomes the same as that of the NAND-Flashes 7 and 8. In other words, electrical power supplied to the control unit 21 is also supplied to the NAND-Flashes 7 and 8 by the reset IC 32 and the FET 31. Accordingly, the voltages of the power supply to the NAND-Flashes 7 and 8, which are the voltages applied (output) to the NAND-Flashes 7 and 8 from the voltage output terminal 12b, are voltages required for reading/writing data to the NAND-Flashes 7 and 8.

Furthermore, if the voltage monitored by the reset IC 32 is less than 2.9 V, the reset IC 32 allows the FET 31 to be in a non-conducting state by making a signal that is output to the gate terminal G of the FET 31 a low level "L". By doing so, because the voltages of the power supply to the NAND-Flashes 7 and 8 drop, the NAND-Flashes 7 and 8 are separated from the power supply to the control unit 21. In other words, the reset IC 32 and the FET 31 switch electrical power such that the electrical power supplied to the control unit 21 is not supplied to the NAND-Flashes 7 and 8.

If the NAND-Flashes 7 and 8 are separated from the power supply to the control unit 21, i.e., if the reset IC 32 and the FET 31 switch electrical power such that the electrical power supplied to the control unit 21 is not supplied to the NAND-Flashes 7 and 8, the condenser 33 has a function of maintaining the voltage that is applied to the NAND-Flashes 7 and 8 at the voltage that is necessary for the writing of data for the period of time required for writing the data from buffers in the NAND-Flashes 7 and 8 to the ROM.

The capacitance of the condenser 33 can be set based on the maximum electrical power consumption in a ROM, the maximum writing time from a buffer to the ROM, a voltage of the control unit 21, and the minimum operating voltage in the ROM. More specifically, the capacitance of the condenser 33 can be set using the equation below:

$$\frac{I \times T}{(V_1 - V_2)} = C,$$

where I is the maximum electrical power consumption in a ROM (which increases proportional to the number), T is the maximum writing time from a buffer to the ROM, $V_1$ is a voltage detected by the reset IC 32, $V_2$ is the minimum operating voltage in the ROM, and C is the capacitance.

The condenser 33 has a capacity according to the number of NAND-Flashes 7 and 8 (two in this case). Accordingly, if the number of NAND-Flashes is one or three or more, the condenser 33 is preferably configured such that the condenser 33 has a capacity according to the number of NAND-Flashes.

Furthermore, the power supply control circuit 12 described above can also be used for the NOR-Flash 9 by changing the capacity of the condenser 33 available for the NOR-Flash 9.

Furthermore, a condenser whose capacitance is a variable capacity can be used for the condenser 33.

If a monitored voltage is less than 2.9 V, the reset IC 32 resets the CPU 1 or the NAND-CTL 6.

If the CPU 1 or the NAND-CTL 6 is reset, a write command to the NAND-Flashes 7 and 8 or the NOR-Flash 9 is not issued. Specifically, when power supply to the control unit 21 is less than 2.9 V, if the voltage necessary for the writing of data for the period of time during which the NAND-Flashes 7 and 8 or the NOR-Flash 9 complete the writing of data in the ROM in accordance with the write command that is issued until that time, blocks of the NAND-Flashes 7 and 8 or the NOR-Flash 9 are not corrupted.

Figure 4:
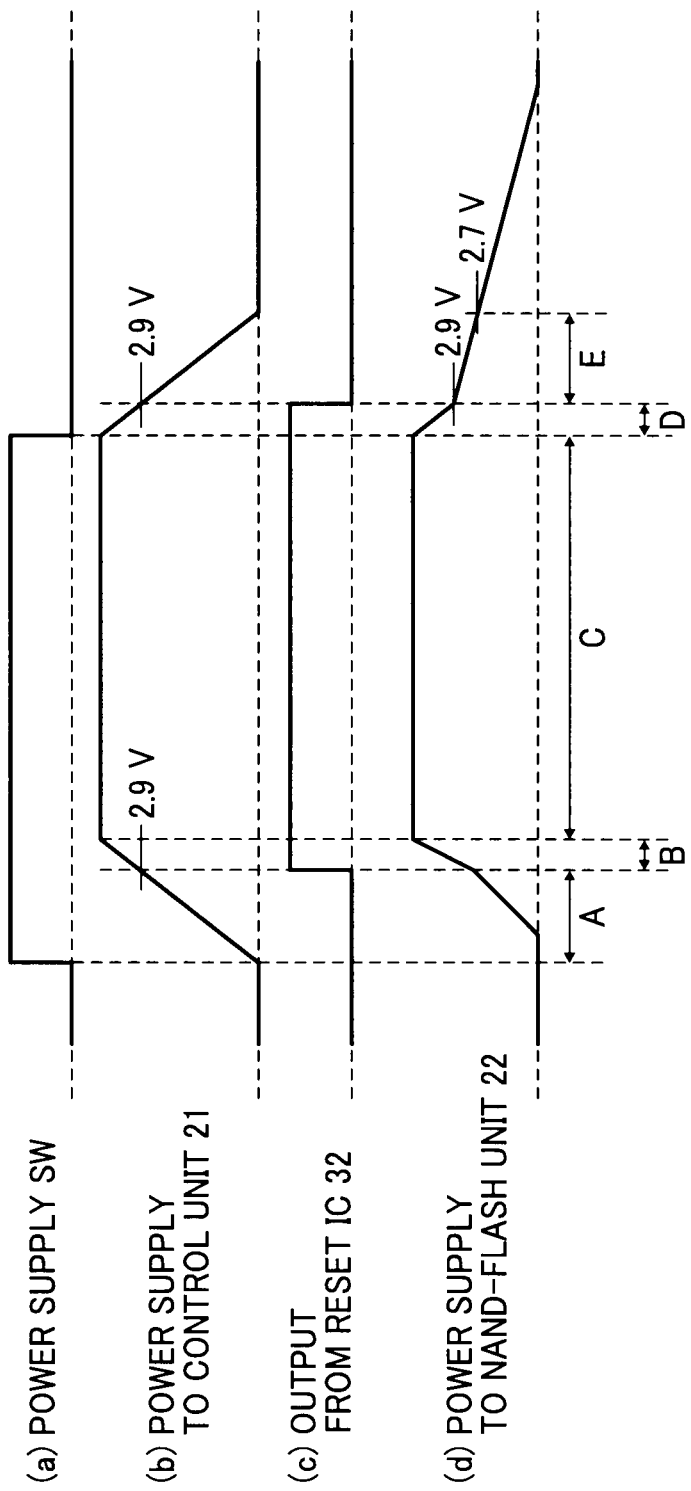
FIG. 4 is a schematic diagram illustrating an example of an operation sequence of the power supply control circuit according to the embodiment.

FIG. 4 is a schematic diagram illustrating an example of an operation sequence of the power supply control circuit 12 illustrated in FIG. 3. As illustrated in (a) of FIG. 4, if a power supply switch (power supply SW) (not shown) of the image forming apparatus 100 is turned on, the voltage of the power supply to the control unit 21 rises, as illustrated in (b) of FIG. 4. At this time, the voltages of the power supply to the NAND-Flashes 7 and 8 rises with little delay via the parasitic diode 31a in the FET 31, as illustrated in (d) of FIG. 4 (explanation of the period A).

As illustrated in (b) of FIG. 4, if the voltage of the power supply to the control unit 21 rises to 2.9 V, an output of the reset IC 32 changes to "H", as illustrated in (c) of FIG. 4. Accordingly, the FET 31 enters a conducting state and thus the voltages of the power supply to the NAND-Flashes 7 and 8 become the same voltage as that of the power supply to the control unit 21, as illustrated in (d) of FIG. 4 (explanation of the period B).

Then, the control unit 21 starts its operation in a state in which both of the voltage of the power supply to the control unit 21 and the voltage of the power supply to the NAND-Flashes 7 and 8 rise (explanation of the period C).

Thereafter, as illustrated in (a) of FIG. 4, if the power supply switch is turned off, the FET 31 is in a conducting state until the voltage of the power supply to the control unit 21 drops to 2.9 V, as illustrated in (b) of FIG. 4. Accordingly, the voltage of the power supply to the NAND-Flashes 7 and 8 also drops to 2.9 V, as illustrated in (d) of FIG. 4 (explanation of the period D).

If the power supply to the control unit 21 drops to less than 2.9 V, an output from the reset IC 32 changes to "L", as illustrated in (c) of FIG. 4. Accordingly, the FET 31 enters a non-conducting state, thereby the NAND-Flashes 7 and 8 are separated from the power supply to the control unit 21. Specifically, the power supply to the control unit 21 and the power supply to the NAND-Flashes 7 and 8 are separated.

The condenser 33, which is connected to the voltage output terminal 12b, can maintain the voltage of the power supply to the NAND-Flashes 7 and 8, which is the voltage applied to the NAND-Flashes 7 and 8, for a predetermined period of time until the voltage drops to 2.7 V ("700 μsec" in this case).

Accordingly, even when the power supply switch is turned off (even when the power supply is interrupted) during the writing of data to the NAND-Flashes 7 and 8 performed by the NAND-CTL 6, as illustrated in (d) of FIG. 4, if the voltages of the power supply to the NAND-Flashes 7 and 8 are maintained for 700 μsec, during which time the voltages drop to 2.7 V, it is possible to complete the writing of data from the buffers in the NAND-Flashes 7 and 8 to the ROM (explanation of the period E).

Accordingly, even if the power supply is interrupted during the writing of data to the NAND-Flashes 7 and 8, blocks of the NAND-Flashes 7 and 8 are not corrupted.

Figure 5:
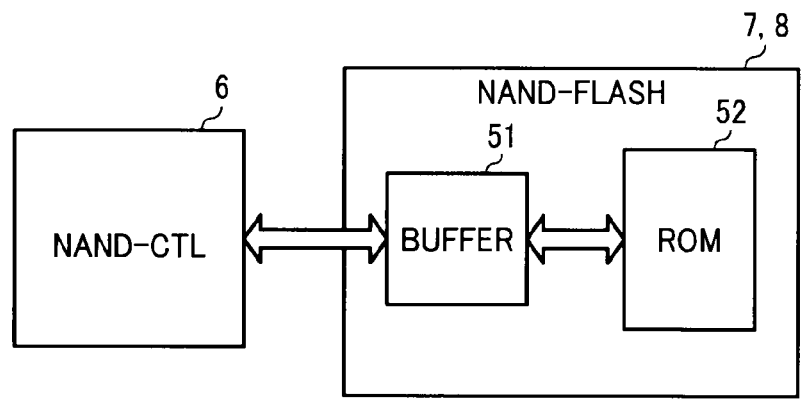
FIG. 5 is a block diagram illustrating the internal configuration of NAND-Flashes according to the embodiment.

FIG. 5 is a block diagram illustrating the internal configuration of the NAND-Flashes 7 and 8 illustrated in FIG. 2. The NAND-Flashes 7 and 8 each include a buffer 51 and a ROM 52.

The buffers 51 in the NAND-Flashes 7 and 8 temporarily store therein write data received from the NAND-CTL 6. The data stored in the buffers 51 is written to the ROM 52 in page units.

The NAND-CTL 6 does not transmit the subsequent write data before the writing of data to the ROM 52 is completed; therefore, even if the power supply is interrupted during the writing of data, it is desirable to complete the writing of data. With NAND-Flashes currently on the market, the maximum time required for the writing of data from a buffer to an ROM is 700 μsec.

Accordingly, in the embodiment, even when the power supply is interrupted during the writing of data to the NAND-Flashes 7 and 8 performed by the NAND-CTL 6, the power supply is maintained for 700 μsec until the voltages of the power supply of the NAND-Flashes 7 and 8 drop to 2.7 V.

Figure 6:
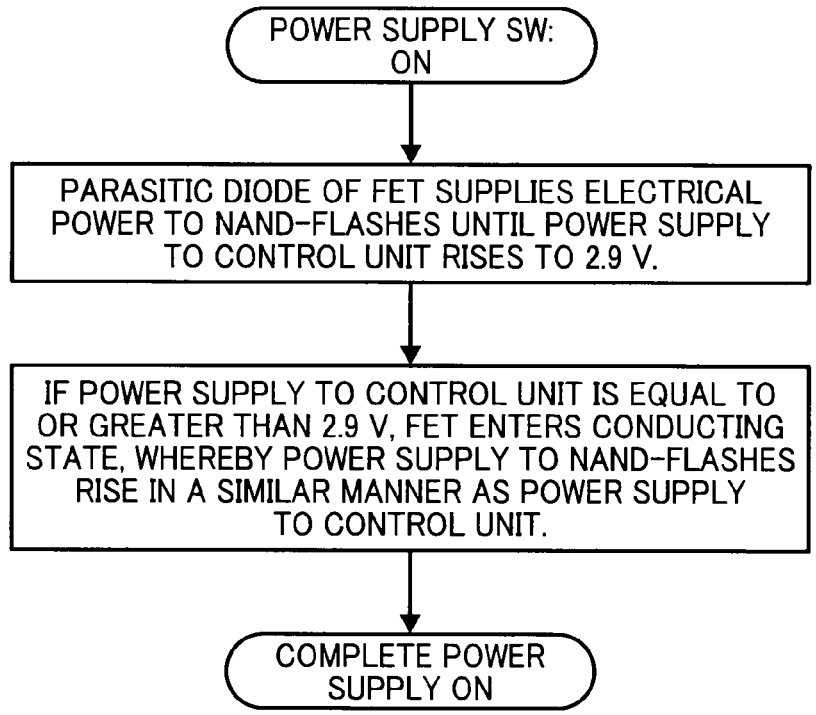

FIG. 6 is a flowchart illustrating an example of the operation flow of the power supply control circuit 12 illustrated in FIG. 3 when the power supply switch is turned on. FIG. 7 is a flowchart illustrating an example of the operation flow of the power supply control circuit 12 in which the power supply switch is turned off.

As illustrated in FIG. 6, if the power supply switch is turned on, the parasitic diode 31a of the FET 31 supplies electrical power to the NAND-Flashes 7 and 8 until the voltage of the power supply to the control unit 21 rises to 2.9 V. By doing so, the condenser 33 is gradually charged and, therefore, the voltages of the power supply to the NAND-Flashes 7 and 8 rise.

If the power supply to the control unit 21 is equal to or greater than 2.9 V, the reset IC 32 detects that state and the FET 31 enters the conducting state, whereby the voltage of the power supply to the control unit 21 becomes the same as that to the NAND-Flashes 7 and 8. At this stage, the operation that is performed when the power supply switch is turned on is completed, at which time the control unit 21 starts its operation.

As illustrated in FIG. 7, if the power supply switch is turned off, the FET 31 is in the conducting state until the voltage of the power supply to the control unit 21 rises to 2.9 V. Accordingly, the voltages of the power supply to the NAND-Flashes 7 and 8 drops to 2.9 V.

Then, if the reset IC 32 detects that the voltage of the power supply to the control unit 21 drops to a level less than 2.9 V, the reset IC 32 allows the FET 31 to be in the non-conducting state.

If the FET 31 enters the non-conducting state, the power supply to the control unit 21 is separated from the power supply to the NAND-Flashes 7 and 8. In other words, the reset IC 32 and the FET 31 switch electrical power that is supplied to the control unit 21 such that the electrical power is not supplied to the NAND-Flashes 7 and 8.

The load that is applied to the power supply of the NAND-Flashes 7 and 8 is only for the NAND-Flashes 7 and 8. Accordingly, the condenser 33 that is connected to the NAND-Flashes 7 and 8 maintains a voltage necessary for the writing of data for 700 μsec or more until the voltage drops to 2.7 V even during the writing of data to the NAND-Flashes 7 and 8.

If the condenser 33 has capacity to maintain the voltage for 700 μsec during which time the voltage necessary for the writing of data to the NAND-Flashes 7 and 8 drops to 2.7 V, blocks of the NAND-Flashes 7 and 8 are not corrupted; therefore, the writing of data to the NAND-Flashes 7 and 8 is reliably completed. Furthermore, if the condenser 33 has a capacity of 250 μF for each NAND-Flash, the voltage necessary for writing of data is usually maintained.

After the voltage is maintained, i.e., after the completion of the writing of data to the NAND-Flashes 7 and 8, the voltage of the power supply to the NAND-Flashes 7 and 8 become 0 V due to self discharge, thus completing the operation performed when the power supply switch is turned off.

As described above, according to the embodiment, the entirety of the control unit 21 is not protected at the time of power supply interruption. Instead, the voltage that is applied to the flash memory is maintained at the voltage that is necessary for the writing of data for the period of time required for the writing of data to the flash memory (NAND-Flash and NOR-Flash). Accordingly, it is possible to avoid corrupting blocks of the flash memory when the power supply is interrupted during the writing of data without arranging a large-capacity backup power supply or condenser. Furthermore, all of the functions related to the present invention can be constructed using hardware. Accordingly, there is no software dependency, thus the flash memories can be always protected.

Furthermore, in the embodiment, the reset IC monitors the voltage of the power supply to the control unit 21 that is generated by electrical power provided from a commercial power supply; however the configuration is not limited thereto. For example, the reset IC may be configured to monitor voltages applied to the NAND-Flashes 7 and 8. When the voltages becomes less than a predetermined value, the NAND-Flashes 7 and 8 may be separated from the power supply to the control unit 21, i.e., electrical power that is supplied to the control unit 21 is configured not to be supplied to the NAND-Flashes 7 and 8.

As described above, according to the power supply control device of the embodiment, it is possible to avoid corrupting blocks of the flash memory when a power supply is suddenly interrupted and to enhance the protection of the flash memories without arranging a large-capacity backup power supply or a large-capacity condenser that protect the entire control unit 21 of the electronic device. Accordingly, it is possible to provide low-cost power supply control devices and electronic devices.

Furthermore, in the embodiment, a case is described as an example in which the FET 31 switches such that electrical power supplied to the control unit 21 is either supplied to the NAND-Flashes 7 and 8 or is not supplied to the NAND-Flashes 7 and 8; however, the switching unit is not limited to the FET 31. For example, instead of the FET 31, a bipolar transistor can also be used. However, when using the FET 31, the switching speed can be faster than when using a bipolar transistor.

Furthermore, in the embodiment, as illustrated in FIG. 5, the NAND-Flashes 7 and 8 that each include the buffer 51 and the ROM 52 are described as an example; however, the configuration is not limited thereto. A nonvolatile memory that does not include a buffer may also be applied to the embodiment for supplying electrical power. In such a case, when the capacitance of the condenser 33 is set, the maximum writing time (writing completion time) from the buffer to the ROM is the maximum writing time (writing completion time) from the NAND-CTL 6 to the nonvolatile memory.

According to an aspect of the present invention, it is possible to avoid corrupting blocks of the flash memory when a power supply is suddenly interrupted and to enhance the protection of the flash memories without arranging a large-capacity backup power supply or condenser.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A power supply control device comprising:
   an electrical power generating unit that generates electrical power and supplies the generated electrical power to an electronic device having a nonvolatile memory and a control unit;
   a switching unit that monitors a voltage of electrical power supplied to the electronic device, and switches such that, when the voltage is less than a predetermined threshold value, the electrical power is supplied to the control unit and is not supplied to the nonvolatile memory; and
   a capacitor that maintains, when the electrical power is switched to be supplied to the control unit and not to be supplied to the nonvolatile memory, a voltage applied to the nonvolatile memory for a period of time during which writing of data to the nonvolatile memory can be completed.

2. The power supply control device according to claim 1, wherein
   the electrical power generating unit supplies the generated electrical power to the control unit, and
   the switching unit monitors a voltage of electrical power supplied to the control unit, switches such that, when the voltage is equal to or greater than the threshold value, the electrical power supplied to the control unit is also supplied to the nonvolatile memory, and switches such that, when the voltage drops to less than the threshold value, the electrical power supplied to the control unit is not supplied to the nonvolatile memory.

3. The power supply control device according to claim 2, wherein
   the capacitor includes a condenser,
   the switching unit includes a reset circuit connected to the control unit monitors a voltage of electrical power supplied to the control unit, and a transistor connected to the control unit and the nonvolatile memory, and
   when the voltage is equal to or greater than the threshold value, by controlling the transistor to be in a conducting state, the reset circuit supplies electrical power supplied to the control unit to the nonvolatile memory and, when the voltage drops to less than the threshold value, by controlling the transistor to be in a non-conducting state, the reset circuit does not supply the electrical power supplied to the control unit to the nonvolatile memory.

4. The power supply control device according to claim 3, wherein
   the transistor is a field effect transistor, and
   in the field effect transistor, a terminal that outputs a voltage of electrical power of the control unit is connected to a drain terminal, a terminal that is used to apply a voltage to the nonvolatile memory and a terminal of the condenser are connected to a source terminal, and an output terminal of the reset circuit is connected to a gate terminal.

5. The power supply control device according to claim 4, wherein a parasitic diode is inserted between the drain terminal and the source terminal in the field effect transistor.

6. The power supply control device according to claim 1, wherein
   the nonvolatile memory includes a buffer and a ROM, and
   when the electrical power is switched to be supplied to the control unit, the capacitor maintains a voltage applied to the nonvolatile memory for a period of time during which writing of data from the buffer to the ROM can be completed.

7. The power supply control device according to claim 6, wherein capacitance of the condenser is set based on a maximum electrical power consumption of the ROM, a maximum writing time from the buffer to the ROM, a voltage of the control unit, and a minimum operating voltage of the ROM.

8. The power supply control device according to claim 7, wherein the capacitance of the condenser is a value calculated by dividing a value that is a product of maximum electrical power consumption and the maximum writing time by a value that is a difference between a voltage of the control unit and the minimum operating voltage.

9. The power supply control device according to claim 7, wherein the capacitance of the condenser is set in accordance with the number of nonvolatile memories.

10. An image forming apparatus comprising:
    a nonvolatile memory;
    a control unit that performs an overall control of the image forming apparatus;
    an electrical power generating unit that generates electrical power and supplies the generated electrical power to the nonvolatile memory and the control unit;
    a switching unit that monitors a voltage of electrical power supplied to the control unit, and switches such that, when the voltage drops to less than a predetermined threshold value, the electrical power is supplied to the control unit and is not supplied to the nonvolatile memory; and
    a capacitor that maintains, when the electrical power is switched to be supplied to the control unit and not to be supplied to the nonvolatile memory, a voltage applied to the nonvolatile memory for a period of time during which writing of data to the nonvolatile memory can be completed.

11. A method of controlling power supply that is performed by a power supply control device, the method comprising:
    generating electrical power and supplying the generated electrical power to an electronic device having a nonvolatile memory and a control unit;
    monitoring a voltage of electrical power supplied to the electronic device;
    switching, when the voltage drops to less than a predetermined threshold value, the electrical power such that the electrical power is supplied to the control unit and is not supplied to the nonvolatile memory; and
    maintaining, when the electrical power is switched to be supplied to the control unit and not to be supplied to the nonvolatile memory, a voltage applied to the nonvolatile memory for a period of time during which writing of data to the nonvolatile memory can be completed.

12. The power supply control device according to claim 1, wherein the capacitor does not apply the voltage applied to the nonvolatile memory to the control unit.

13. The image forming apparatus according to claim 10, wherein the capacitor does not apply the voltage applied to the nonvolatile memory to the control unit.

14. The method of according to claim 11, wherein the voltage applied to the nonvolatile memory for a period of time during which writing of data to the nonvolatile memory can be completed is not applied to the control unit.

* * * * *